United States Patent
Karunakaran et al.

(10) Patent No.: US 8,428,021 B2
(45) Date of Patent: Apr. 23, 2013

(54) ARCHITECTURE USING INEXPENSIVE, MANAGED WIRELESS SWITCHING POINTS TO DELIVER LARGE SCALE WLAN

(75) Inventors: Kumara Das Karunakaran, San Jose, CA (US); Tilak Ravi, Milpitas, CA (US); Curtis Santos, Santa Clara, CA (US)

(73) Assignee: Avaya, Inc., Basking Ridge, NJ (US)

( * ) Notice: Subject to any disclaimer, the term of this patent is extended or adjusted under 35 U.S.C. 154(b) by 383 days.

(21) Appl. No.: 12/775,026

(22) Filed: May 6, 2010

(65) Prior Publication Data

US 2010/0290358 A1 Nov. 18, 2010

Related U.S. Application Data (60) Provisional application No. 61/178,303, filed on May 14, 2009.

(51) Int. Cl.
*H04W 4/00* (2009.01)
*H04L 12/24* (2006.01)
*H04L 12/66* (2006.01)

(52) U.S. Cl.
USPC ............ 370/329; 370/338; 370/341; 370/351

(58) Field of Classification Search .......................... None
See application file for complete search history.

(56) References Cited

U.S. PATENT DOCUMENTS

| | | | | |
|---|---|---|---|---|
| 7,606,189 | B1 * | 10/2009 | Lee et al. ...................... | 370/328 |
| 7,881,226 | B2 * | 2/2011 | Chen et al. .................... | 370/254 |
| 8,116,760 | B2 * | 2/2012 | Gu .............................. | 455/426.1 |
| 2004/0252696 | A1 * | 12/2004 | Kakishima et al. ........ | 370/395.2 |
| 2005/0152288 | A1 * | 7/2005 | Datla et al. .................... | 370/256 |
| 2005/0246443 | A1 * | 11/2005 | Yao et al. ...................... | 709/227 |
| 2006/0036765 | A1 | 2/2006 | Weyman | |
| 2006/0274774 | A1 * | 12/2006 | Srinivasan et al. ............ | 370/420 |
| 2007/0171822 | A1 * | 7/2007 | Tse-Au ......................... | 370/231 |
| 2008/0310430 | A1 | 12/2008 | He | |

FOREIGN PATENT DOCUMENTS

EP 2086178 A1 8/2009

OTHER PUBLICATIONS

European Search Report dated Jul. 28, 2010 from EP Publication No. 2252007 for corresponding European Patent Application No. 10004962.6.

* cited by examiner

*Primary Examiner* — Chi Pham
*Assistant Examiner* — Soon-Dong D Hyun
(74) *Attorney, Agent, or Firm* — Anderson Gorecki & Rouille LLP (57) ABSTRACT

Methods, apparatus and a computer program product provide for a network architecture implemented between a Wireless Switching Point and a remote Wireless Controller. The Wireless Switching Point contains only a first data plane portion. At least one incoming data packet is received at a respective port of the Wireless Switching Point. Based on data included within the at least one incoming data packet, the Wireless Switching Point determines a first current network interface utilized by at least one port of the Wireless Switching Point. The Wireless Switching Point uploads the first current network interface to a remote Wireless Controller—which implements a first control plane capability on behalf of the Wireless Switching Point. After uploading the first current network interface, the Wireless Switching Point receives an update, provided by the remote Wireless Controller, to the first current network interface.

20 Claims, 6 Drawing Sheets

ARCHITECTURE USING INEXPENSIVE, MANAGED WIRELESS SWITCHING POINTS TO DELIVER LARGE SCALE WLAN

CROSS REFERENCE TO RELATED APPLICATIONS

This U.S. Utility Patent Application claims the benefit of the filing date of an earlier filed U.S. Provisional Application for patent having U.S. Ser. No. 61/178,303, filed on May 14, 2009 entitled "ARCHITECTURE USING INEXPENSIVE, MANAGED WIRELESS SWITCHING POINTS TO DELIVER LARGE SCALE WLAN." The entire teaching, disclosure and contents of this provisional patent are hereby incorporated by reference herein in their entirety.

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices. Most of current generation computer networks employ special purpose appliances called Wireless Controllers for managing wireless client devices. Such environment is called overlay networks to indicate that wireless is overlaid on top of wired. Certain computer networks can provide an environment in which both wired and wireless users are supported by a same set of network switches. Such an environment can be described as a unified network.

Computer networks can include various configurations. One such configuration, known as a local area network (LAN), provides network connectivity to a group of client computers. This group is typically small relative to other networks, and is often limited to a specific geographical area or network switch. A wireless local area network (WLAN) allows computing devices to move around within a local area and maintain network connectivity. A virtual local area network (VLAN) enables a group of client computers to communicate and access specific resources as members of a given domain even if the various member client computers are not attached to the same network switch.

Wireless Local Area Networks (WLANs) are a popular and inexpensive way to allow multiple users of "mobile units" (MUs) to communicate with each other, to access a wired LAN, to access a local server, to access a remote server, such as over the Internet, etc. A wireless local area network (WLAN) typically includes an Access Point (AP), Wireless Controller and one or more mobile units. Each mobile unit may be a device such as a notebook computer, personal digital assistant (PDA), wireless VoIP telephone or the like that transmits radio signals to and receives radio signals from other devices in the local area network via the AP. The mobile unit includes a wireless transceiver which can communicate with an access point. The communication can occur via radio waves, infrared, or any other known form of wireless communication. The access point allows wireless mobile units to communicate with each other and to communicate with infrastructure connected to the access point.

The server can provide services, such as access to applications like an email system, a word processing program, an accounting system and/or a dedicated database. Wireless LANs are employed within such facilities as businesses, university classrooms or buildings, airport lounges, hotel meeting rooms, residences etc. When a user is physically located in the vicinity of an access point, the transceiver of the mobile unit communicates with the access point and a connection to the wireless LAN is established with approval from the Wireless Controller.

APs and mobile units transmit data in units referred to as frames over a shared-communications channel. Frames transmitted from a mobile unit to an AP are referred to as uplink frames, and frames transmitted from an AP to a mobile unit are referred to as downlink frames. In a situation where two or more mobile units (or an AP and a mobile unit) transmit frames simultaneously, then one or more of the frames can become corrupted, referred to as a collision. As a result, Wireless Local Area Networks (WLANs) typically employ one or more protocols to ensure that a mobile unit or AP can gain exclusive access to the shared-communications channel for a predetermined interval of time in order to transmit its frames without collisions occurring.

Certain wireless network protocols (e.g., Institute of Electrical and Electronics Engineers [IEEE] 802.11, etc.) provide for the AP to periodically broadcast a special frame called a beacon that can be heard by the mobile units in the BSA (basic service area), the area covered by the AP. The beacon contains a variety of information that enables the mobile units to establish and maintain communications in an orderly fashion, such as a timestamp, which enables mobile units to synchronize their local clocks, and signaling information (e.g., channel number, frequency hopping pattern, dwell time, etc.).

BRIEF DESCRIPTION

In a conventional overlay environment, traditional wireless controllers handle both control plane traffic as well as data plane traffic (e.g. wireless data plane traffic). As wireless LAN becomes more prevalent and even more wireless client devices appear in the network—utilizing faster access speeds, the wireless traffic on the overlay network scales exponentially as a consequence. To handle this explosion in traffic, yet even wireless controllers must be deployed in the overlay network. This is an expensive proposition—not just from the cost of the devices, but the additional, operational cost involved in maintaining them as well. Deploying additional wireless controller also results in sub-optimal utilization of these overlay controllers since their control planes are under-utilized and over-distributed, while their data planes are over utilized. Deployment and maintenance of the devices is also a manual process, which is time consuming and requires specially trained professionals.

Techniques discussed herein significantly overcome the deficiencies of conventional network deployments such as those discussed above. As will be discussed further, certain specific embodiments herein are directed to a split data plane/control plane network architecture.

Specifically, methods, apparatus and a computer program product, described herein, provide for a network architecture implemented between a Wireless Switching Point and a remote Wireless Control Point. It is noted that, for the remainder of the discussion herein, the terms Wireless Control Point and Wireless Controller are used interchangeably. The Wireless Switching Point contains only a first data plane portion. At least one incoming data packet is received at a respective port of the Wireless Switching Point. Based on data included within the at least one incoming data packet, the Wireless Switching Point determines a first current network interface utilized by at least one port of the Wireless Switching Point. The Wireless Switching Point uploads the first current network interface to a remote Wireless Controller—which implements a first control plane capability on behalf of the Wireless Switching Point. After uploading the first current network interface, the Wireless Switching Point receives an update, provided by the remote Wireless Controller, to the first current network interface.

The network architecture described herein is implemented between the Wireless Switching Point and the remote Wireless Controller. Thus, the Wireless Switching Point implements aspects of the network architecture in conjunction with the remote Wireless Controller also implementing other corresponding aspects of the network architecture. The network architecture thereby allows the Wireless Switching Point to operate a data plane, while the remote Wireless Controller manages the Wireless Switching Point by controlling the Wireless Switching Point's operational behavior.

For example, the Wireless Switching Point (implementing a first portion of the network architecture) connects to a wired switch and communicates with multiple access points. As the Wireless Switching Point monitors and detects protocol activity transpiring at its respective ports, the Wireless Switching Point determines the current state of the network topology and data traffic with respect to those nodes currently in communication with the Wireless Switching Point.

Based on the observed protocol activity, the Wireless Switching Point creates a current network interface and sends the current network interface to the remote Wireless Controller. The remote Wireless Controller implements a second portion of the network architecture—such as a control plane capability on behalf of the Wireless Switching Point 160. In addition, the remote Wireless Controller concurrently implements multiple control planes on behalf of other multiple, respective Wireless Switching Points—where such additional Wireless Switching Points implement their own data plane as well.

In another embodiment, a network device (such as the remote Wireless Controller) implements aspects of the network architecture described herein. The remote Wireless Controller receives a current network interface from at least one remote network device. The remote Wireless Controller device implements a wireless control plane capability, in accordance with the network architecture, on behalf of the remote network device. It is understood that the remote network device implements its own data control plane in accordance with the network architecture as well.

The remote Wireless Controller processes the current network interface in order to produce a configuration message. The configuration message allows the remote Wireless Controller to manage the remote network device with respect to protocol activity on at least one port of the remote network device. The remote Wireless Controller transmits the configuration message to the remote network device—which can be utilized by the remote network device (e.g. the Wireless Switching Point 160) to update (and/or change) its current network interface.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Avaya Incorporated of Basking Ridge, N.J., herein after referred to as "Avaya."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Wireless Switching Point, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Methods, apparatus and a computer program product provide for a network architecture implemented between a Wireless Switching Point (WSP) and a remote Wireless Controller (RWC). The Wireless Switching Point contains only a first data plane portion. At least one incoming data packet is received at a respective port of the Wireless Switching Point. Based on data included within the at least one incoming data packet, the Wireless Switching Point determines a first current network interface utilized by at least one port of the Wireless Switching Point. The Wireless Switching Point uploads the first current network interface to a remote Wireless Controller—which implements a first control plane capability on behalf of the Wireless Switching Point. After uploading the first current network interface, the Wireless Switching Point receives an update, provided by the remote Wireless Controller, to the first current network interface.

It is understood that the Wireless Switching Point is not described herein as intended to only have a data plane portion—and nothing else internally. Rather, the Wireless Switching Point should be interpreted, in various embodiments, as a network device that is managed by a remote Wireless Controller—where the remote Wireless Controller implements the network device's control plane. Thus, the Wireless Switching Point may have other internal components and modules as well—except that the Wireless Switching Point's control plane is implemented by the remote Wireless Controller in accordance with the network architecture.

Figure 1:
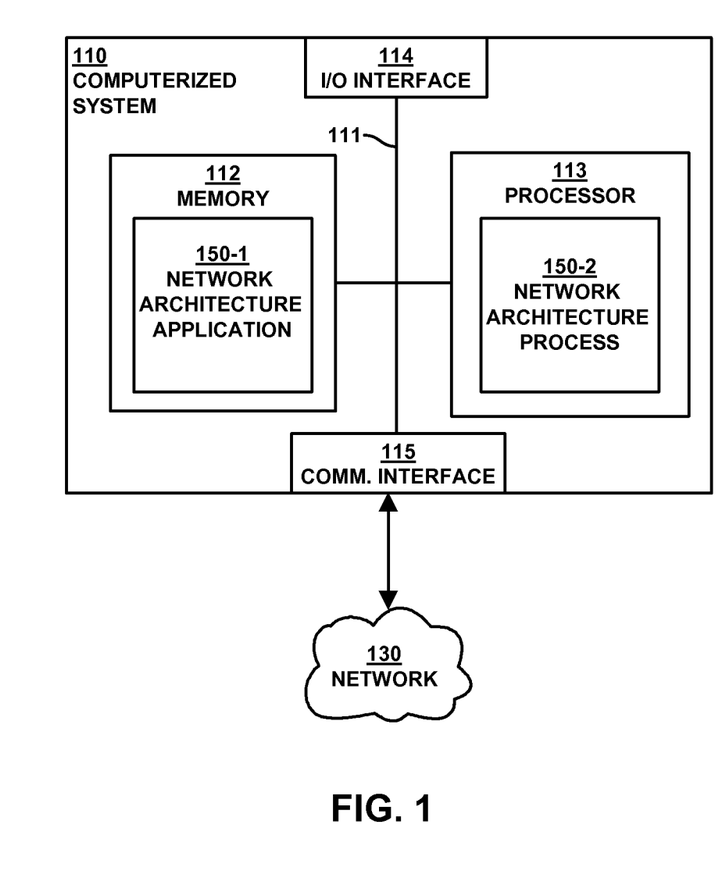
FIG. 1 is an example block diagram illustrating an architecture of a computer system that executes, runs, interprets, operates or otherwise performs a Wireless Switching Point application and/or Wireless Switching Point process according to embodiments herein.

FIG. 1 is an example block diagram illustrating a computer system 110 that executes, runs, interprets, operates or otherwise performs a network architecture application 150-1 and/or network architecture process 150-2 according to embodiments herein.

Note that the computer system 110 may be any type of computerized device such as a personal computer, a client computer system, workstation, portable computing device, console, laptop, network terminal, Wireless Switching Point or a remote Wireless Controller, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, and an input/output interface 114. The computer system 110 can be a client system and/or a server system. As mentioned above, depending on the embodiment, the network architecture application 150-1 and/or the network architecture process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the network architecture application 150-1. Execution of the network architecture application 150-1 in this manner produces the network architecture process 150-2. In other words, the network architecture process 150-2 represents one or more portions or runtime instances of the network architecture application 150-1 (or the entire application 150-1) performing or executing within or upon the processor 113 in the computerized device 110 at runtime.

The network architecture application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. For example, the network architecture application 150-1 can be executed on a remotely accessible computerized device via the communication interface 115.

Further, it is understood that the network architecture 150 described herein can be implemented between a Wireless Switching Point and a remote Wireless Controller. Thus, the Wireless Switching Point implements aspects of the network architecture 150 in conjunction with the remote Wireless Controller implementing other corresponding aspects of the network architecture 150. The network architecture 150 thereby allows the Wireless Switching Point to operate a data plane, while the remote Wireless Controller manages the Wireless Switching Point by implementing the Wireless Switching Point's control plane.

Figure 2:
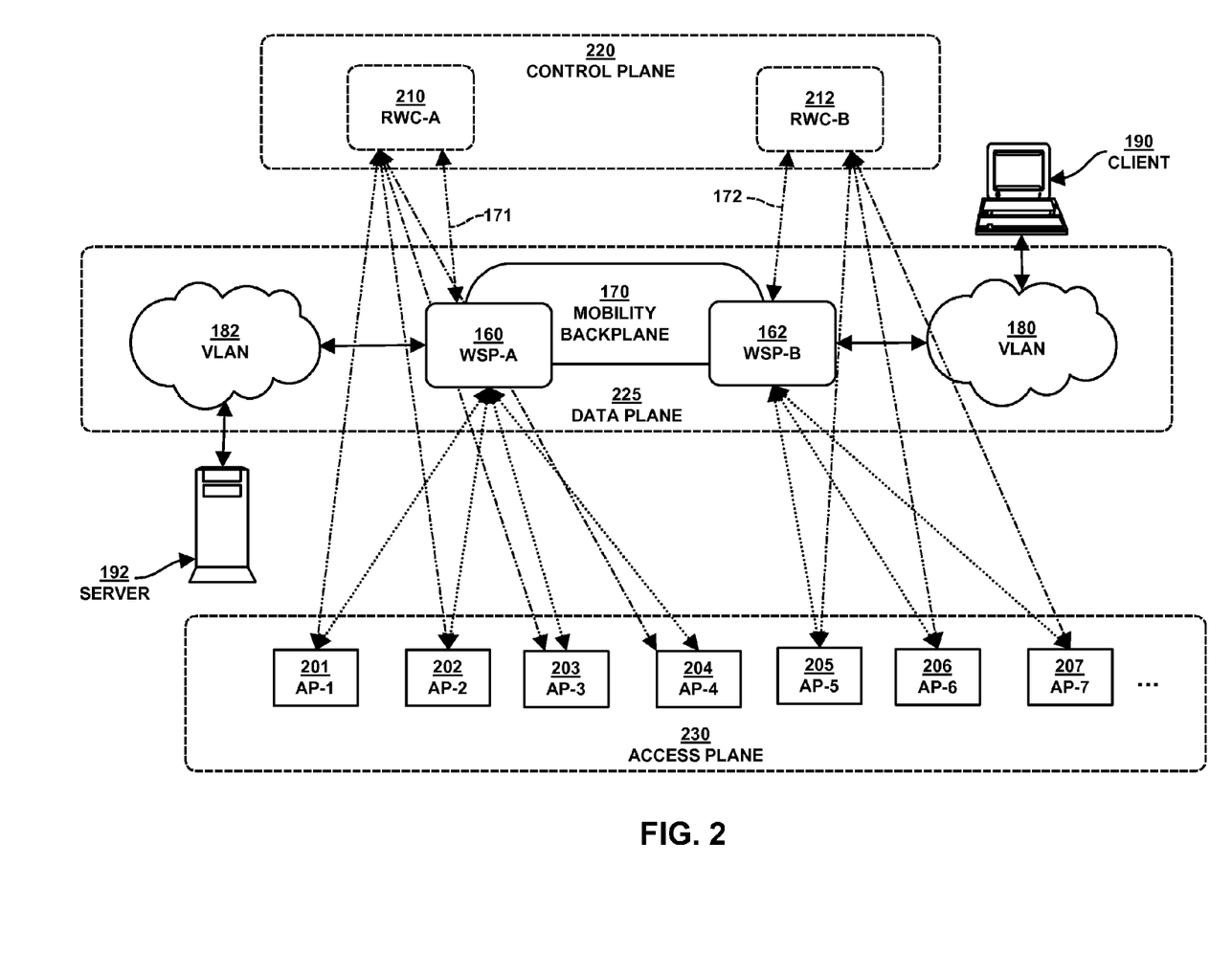
FIG. 2 is an example block diagram of respective portions of a network architecture implemented by Wireless Switching Points and Remote Wireless Controllers according to embodiments herein.

Additionally, it is understood the remote Wireless Controller 210 implements a portion of the network architecture 150 to provide a control plane capability to multiple, respective Wireless Switching Points.

FIG. 2 is an example block diagram of respective portions of a network architecture 150 implemented by Wireless Switching Points and Remote Wireless Controllers according to embodiments herein. As shown in FIG. 2, remote Wireless Controllers 210, 212 form a control plane segment 220 of the network architecture 150. The remote Wireless Controllers 210, 212 respectively communicate with Wireless Switching Point 160s 160, 162 in a data plane segment 225 of the network architecture 150. The Wireless Switching Point 160s 160, 162 are part of a mobility backplane 170 that allow a client 190 to access a server 192 via Virtual Local Area Networks (VLAN) 180, 182. The remote Wireless Controllers also communicate with multiple Access Point 201, 202, 203, 204, 205, 206, 207 in an access plane segment 230 of the network architecture 150.

When a Wireless Switching Point 160, 162 boots up, it requests a Dynamic Host Configuration Protocol (DHCP) IP address through all its respective ports. When the Wireless Switching Point 160, 162 receives a DHCP response, a proper remote Wireless Controller 210, 212 is determined from the message and a control channel 171, 172 with the remote Wireless Controller 210 is established.

The Wireless Switching Point 160, 162 downloads a wired-to-wireless bridging and connectivity profile from the remote Wireless Controller 210, 212. Upon receiving the wired/wireless bridging and connectivity profile, the Wireless Switching Point 160, 162 uses dynamic configuration protocols (such as 802.1AB, LACP, GVRP/MVRP) to configure connectivity and establish appropriate wired-to-wireless bridging.

Additionally, via the network architecture 150, the Wireless Switching Point 160, 162 coordinates DHCP lease expiry/renewal with the remote Wireless Controller 210, 212 and/or peering devices since there are many active peer-to-peer (with other respective Wireless Switching Points) and hierarchical (respective Access Points 201-207 . . . ) connections existing throughout the network infrastructure. Hence, a DHCP lease renewal must be managed properly if there is a risk of changing the Wireless Switching Point's IP address.

The remote Wireless Controller 210, upon receiving the current network interface, validates the Wireless Switching Point 160 against its configuration profile. Thus, by this validation process, the remote Wireless Controller 210 can customize the configuration profile based on available connectivity indicated in the current network interface. The remote Wireless Controller 210 can diagnose connectivity issues (e.g. whether link speed negotiation enabling recommended, whether static speed may be required). Further, the remote Wireless Controller 210 can raise an alert if the connectivity map (indicated in the current network interface sent from the Wireless Switching Point 160) mismatches with configured/planned connectivity described in the configuration profile.

It is understood that, according to the network architecture 150, the remote Wireless Controller 210 manages multiple, respective Wireless Switching Point 160s via parameters set in the configuration profile. The configuration profile, for example, indicates whether to put all ports in a single Link Aggregation Group (LAG), or each port in an individual LAG—as well as which LAG protocol (e.g. LACP, static configuration) to use. The configuration profile can also identify a specific port as a management port that will use a statically provisioned IP address on the specified port for management applications to access the corresponding Wireless Switching Point 160. Reporting of tunnel statistics can also be enabled in the configuration profile, such reporting can occur locally through a SNMP MIB over a selected management interface or remotely through the remote Wireless Controller 210.

FIG. 3 through FIG. 6 illustrate various embodiments of the Wireless Switching Point 160. The rectangular elements in flowcharts 300, 400, 500, 600 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc. Further, the processing blocks represent steps performed by aspects illustrated in FIGS. 1-2.

Flowcharts 300, 400, 500, 600 do not necessarily depict the syntax of any particular programming language. Rather, flowcharts 300, 400, 500, 600 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 3:
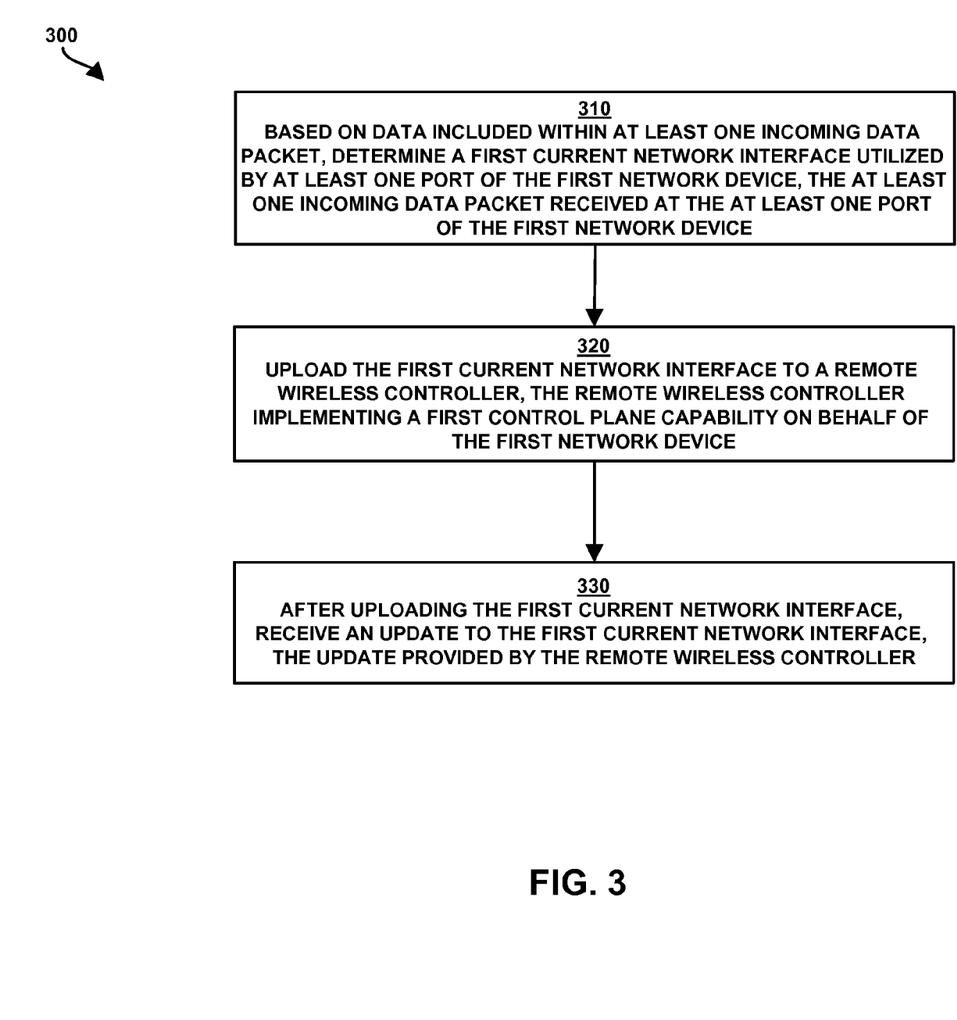
FIG. 3 is a flowchart of an example of processing steps performed by the Wireless Switching Point to update a current network interface according to embodiments herein.

FIG. 3 is a flowchart 300 of an example of processing steps performed by the Wireless Switching Point 160 to update a current network interface according to embodiments herein.

At step 310, based on data included within at least one incoming data packet, a first network device (i.e. the WSP 160) determines a first current network interface utilized by at least one port of the first network device, the at least one incoming data packet received at the at least one port of the WSP 160. It is noted that, in various embodiments, the Wireless Switching Point 160 operates as a virtual switch within a physical host presenting itself as a multi-homed server. The Wireless Switching Point 160 uses the DHCP as well as additional Layer 2 discovery protocols to obtain an IP address and connect to the remote Wireless Controller.

At step 320, the WSP 160 uploads the first current network interface to the remote Wireless Controller, where the remote Wireless Controller 210 implement is a first control plane capability on behalf of the WSP 160. In addition, the Wireless Switching Point 160 can report statistics either directly or through the remote Wireless Controller.

At step 330, after uploading the first current network interface, the WSP 160 receives an update to the first current network interface, the update provided by the remote Wireless Controller. For example, the Wireless Switching Point 160 reconfigures its current network interface, based on a configuration message received from the remote Wireless Controller. Such reconfiguration can occur during a reboot process.

Figure 4:
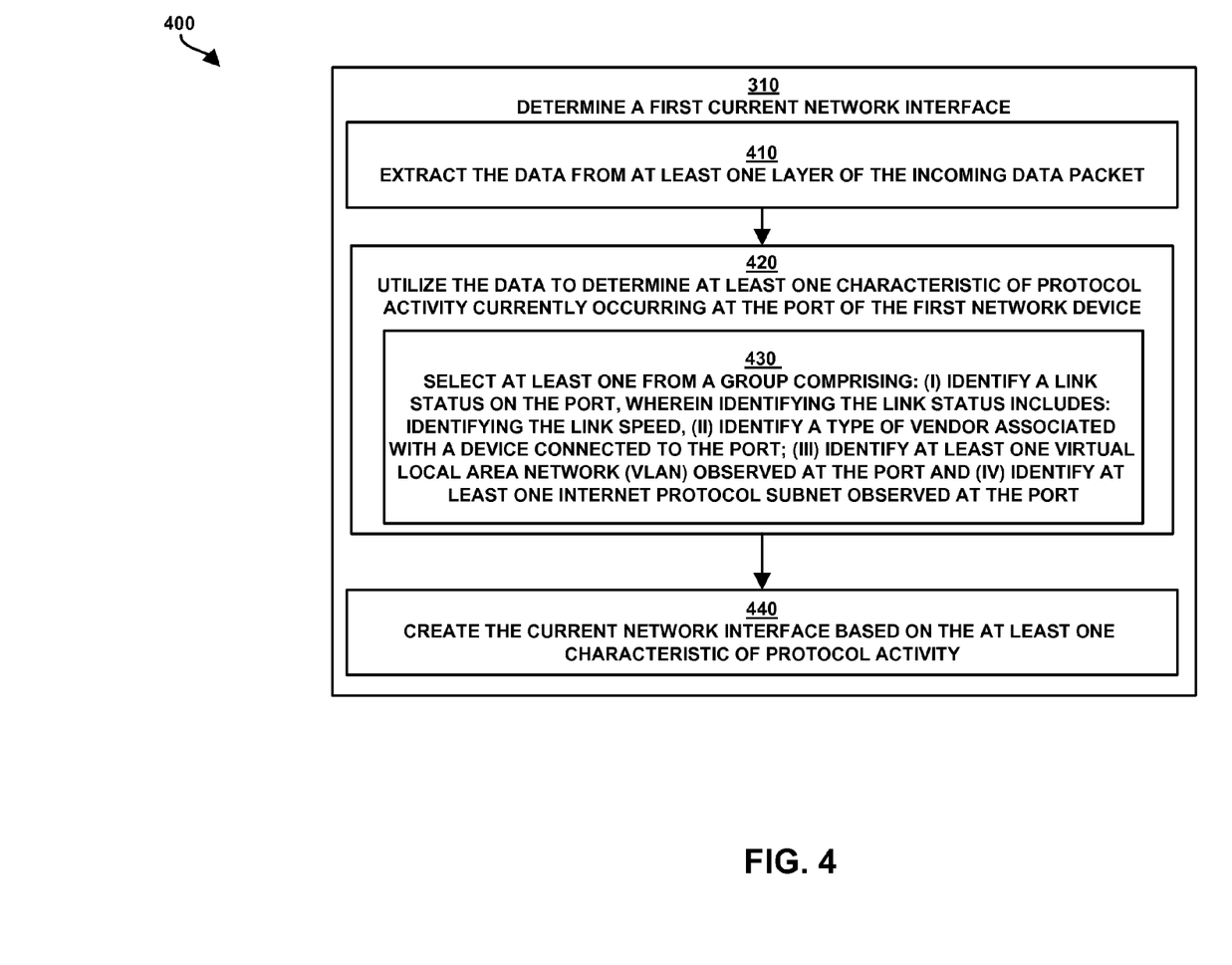
FIG. 4 is a flowchart of an example of processing steps performed by the Wireless Switching Point to monitor protocol activity occurring on at least one port according to embodiments herein.

FIG. 4 is a flowchart 400 of an example of processing steps performed by the Wireless Switching Point 160 to monitor protocol activity occurring on at least one port according to embodiments herein.

At step 410, the WSP 160 extracts the data from at least one layer of the incoming data packet. For example, the Wireless Switching Point 160 snoops Layer 2 and Layer 3 protocol activity from incoming data packets received at its respective ports in order to create a network interface connectivity map (i.e. the current network interface). At step 420, the WSP 160 utilizes the data to determine at least one characteristic of protocol activity currently occurring at the port of the first network device.

At step 430, the WSP 160 selects at least one from a group comprising: (i) identifying a link status on the port, wherein identifying the link status includes: identifying the link speed, (ii) identifying a type of vendor associated with a device connected to the port; (iii) identifying at least one virtual local area network (VLAN) observed at the port and (iv) identifying at least one Internet Protocol subnet observed at the port.

At step 440, the WSP 160 creates the current network interface based on the at least one characteristic of protocol activity.

Figure 5:
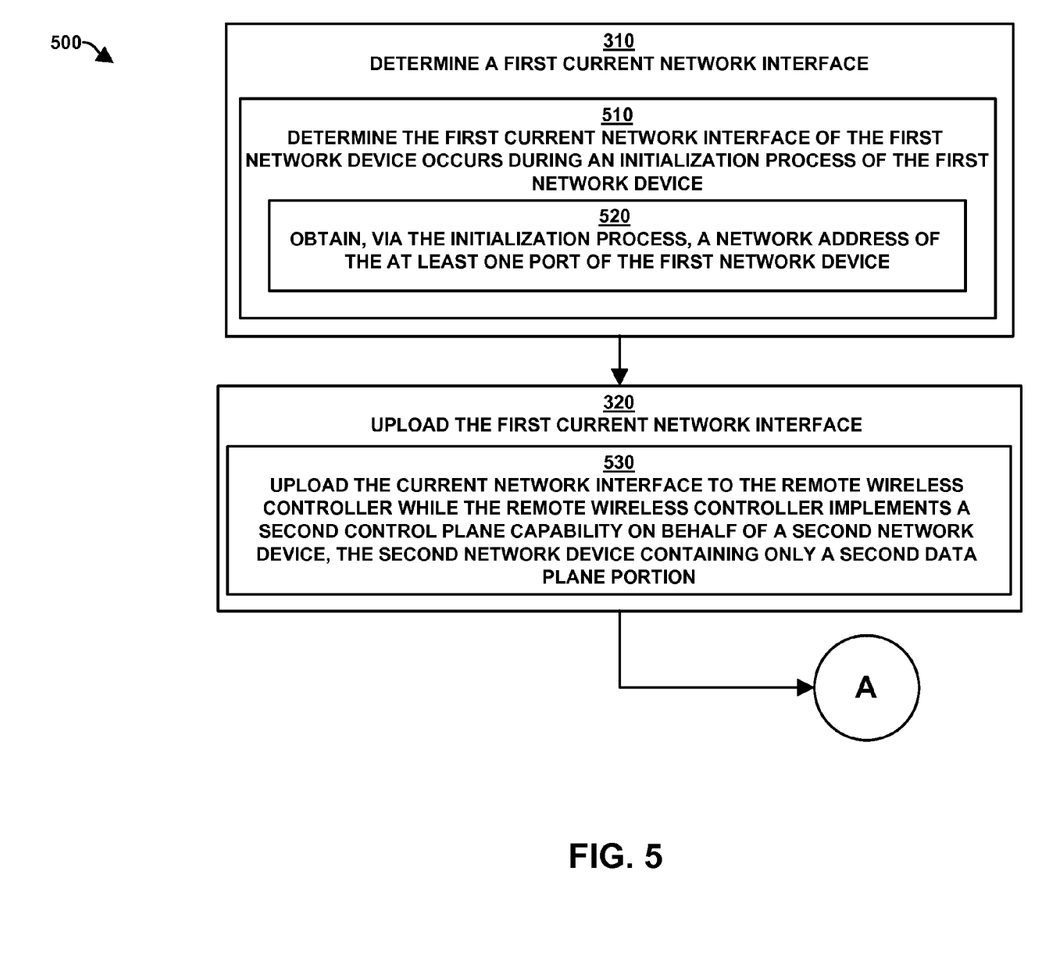
FIG. 5 is a flowchart of an example of processing steps performed by the Wireless Switching Point to determine a current network interface during an initialization process according to embodiments herein.

FIG. 5 is a flowchart 500 of an example of processing steps performed by the Wireless Switching Point 160 to determine a current network interface during an initialization process according to embodiments herein.

At step 510, the WSP 160 determines the first current network interface of the first network device occurs during an initialization process of the first network device At step 520, the WSP 160 obtains, via the initialization process, a network address of the at least one port of the first network device At step 530, the WSP 160 uploads the current network interface to the remote Wireless Controller 210 while the remote Wireless Controller 210 implements a second control plane capability on behalf of a second network device, the second network device containing only a second data plane portion. In one embodiment, upon receiving the current network interface from the Wireless Switching Point 160, the remote Wireless Controller 210 attempts to validate the Wireless Switching Point 160 against the configuration profile that was previously sent by the Wireless Switching Point 160.

Figure 6:
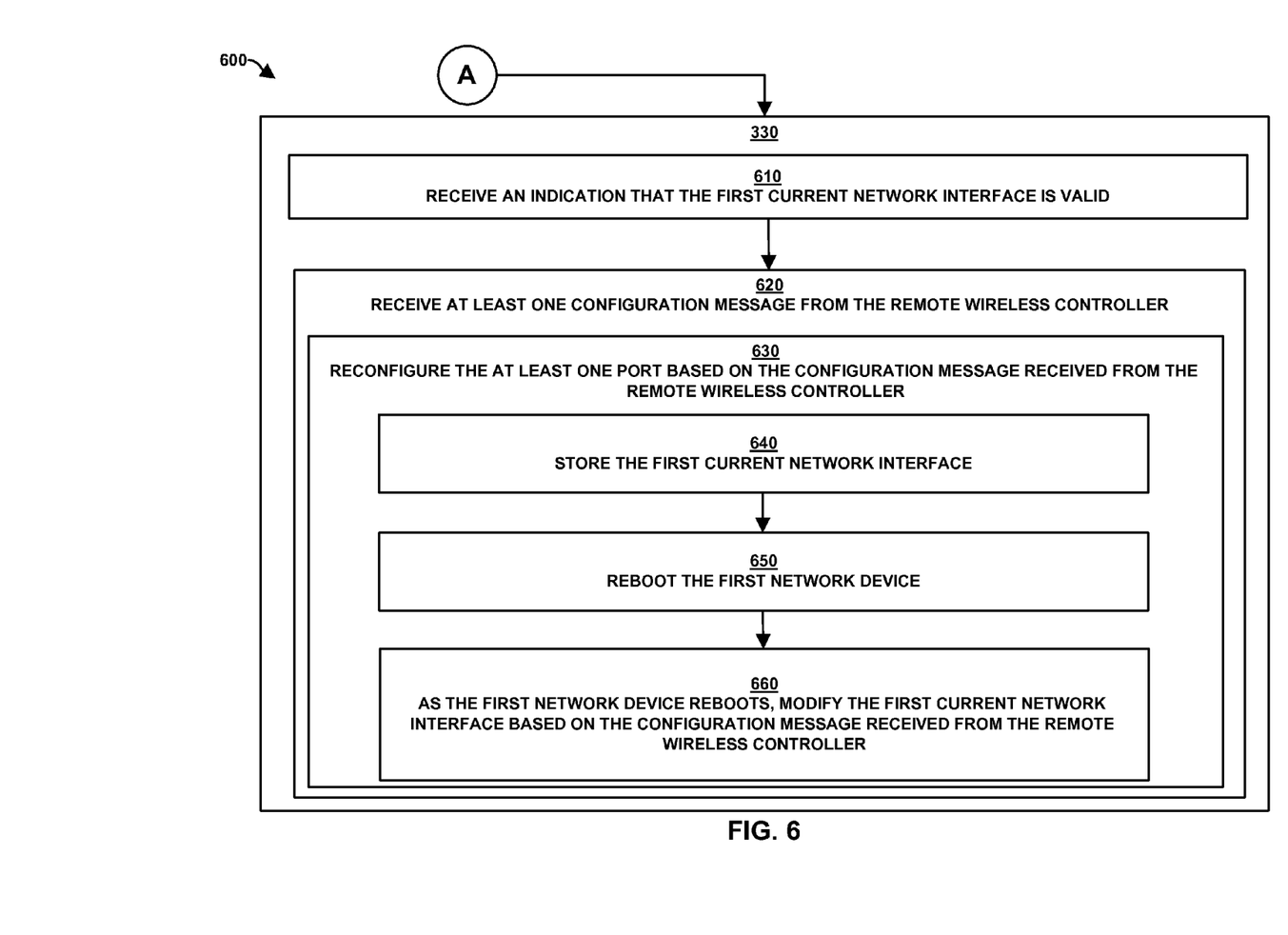
FIG. 6 is a flowchart of an example of processing steps performed by the Wireless Switching Point to utilize a configuration message received by a remote Wireless Controller according to embodiments herein.

FIG. 6 is a flowchart 600 of an example of processing steps performed by the Wireless Switching Point 160 to utilize a configuration message received by a remote Wireless Controller 210 according to embodiments herein.

At step 610, the WSP 160 receives an indication that the first current network interface is valid.

At step 620, the WSP 160 receives at least one configuration message from the remote Wireless Controller.

At step 630, the WSP 160 reconfigures the at least one port based on the configuration message received from the remote Wireless Controller.

At step 640, the WSP 160 stores the first current network interface upon determining that a reboot is required. In order to properly execute the reboot, the Wireless Switching Point 160 keeps all relevant information (i.e. port configuration, IP address, etc.) persistent and commences reboot operations.

At step 650 the WSP 160 undergoes a reboot operation(s). On reboot, the Wireless Switching Point utilizes the persistent first network interface and proceeds to reconfigure its network interface based on the parameters provided in the configuration message.

At step 660, as the WSP 160 boots up, the WSP 160 modifies the first current network interface based on the configuration message received from the remote Wireless Controller.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
  in a first network device containing only a first data plane portion:
    based on data included within at least one incoming data packet, determining a first current network interface utilized by at least one port of the first network device, the at least one incoming data packet received at the at least one port of the first network device;
    uploading the first current network interface to a remote Wireless Controller, the remote Wireless Controller implementing a first control plane capability on behalf of the first network device; and after uploading the first current network interface, receiving an update to the first current network interface, the update provided by the remote Wireless Controller.

2. The method as in claim 1, wherein determining the first current network interface utilized by at least one port of the first network device includes:
   extracting the data from at least one layer of the incoming data packet;
   utilizing the data to determine at least one characteristic of protocol activity currently occurring at the port of the first network device; and
   creating the current network interface based on the at least one characteristic of protocol activity.

3. The method as in claim 2, wherein utilizing the data to determine the at least one characteristic of protocol activity currently occurring at the port of the first network device includes:
   selecting at least one from a group comprising:
      (i) identifying a link status on the port, wherein identifying the link status includes: identifying the link speed;
      (ii) identifying a type of vendor associated with a device connected to the port; and
      (iii) identifying at least one virtual local area network (VLAN) observed at the port.
      (iv) identifying at least one Internet Protocol subnet observed at the port.

4. The method as in claim 1, wherein uploading the first current network interface to the remote Wireless Controller includes:
   uploading the current network interface to the remote Wireless Controller while the remote Wireless Controller implements a second control plane capability on behalf of a second network device, the second network device containing only a second data plane portion.

5. The method as in claim 1, comprising:
   wherein determining the first current network interface of the first network device occurs during an initialization process of the first network device; and
   wherein the initialization process includes: obtaining a network address of the at least one port of the first network device.

6. The method as in claim 1, wherein receiving the update to the first current network interface includes:
   receiving an indication that the first current network interface is valid; and
   receiving at least one configuration message from the remote Wireless Controller.

7. The method as in claim 6, comprising: reconfiguring the at least on port based on the configuration message received from the remote Wireless Controller.

8. The method as in claim 7, wherein reconfiguring the at least on port based on the configuration message includes:
   storing the first current network interface;
   rebooting the first network device; and
   as the first network device boots up, modifying the first current network interface based on the configuration message received from the remote Wireless Controller.

9. The method as in claim 1, comprising:
   wherein determining the first current network interface utilized by at least one port of the first network device includes:
      extracting the data from at least one layer of the incoming data packet;
      utilizing the data to determine at least one characteristic of protocol activity currently occurring at the port of the first network device; and
      creating the current network interface based on the at least one characteristic of protocol activity;
   wherein uploading the first current network interface to the remote Wireless Controller includes:
      uploading the current network interface to the remote Wireless Controller, the remote Wireless Controller concurrently implementing the first control plane capability with a second control plane capability on behalf of a second network device, the second network device containing only a second data plane portion; and
   wherein receiving the update to the first current network interface includes:
      receiving an indication that the first current network interface is valid; and
      receiving at least one configuration message from the remote Wireless Controller, the at least one configuration message providing a reconfiguration of the at least one port of the first network device to occur during a reboot of the first network device.

10. A non-transitory computer readable storage medium comprising executable instructions encoded thereon operable on a computerized device to perform processing comprising:
   instructions for determining, in a first network device containing only a first data plane portion, a first current network interface utilized by at least one port of the first network device, the first current network interface based on data included within at least one incoming data packet received at the at least one port of the first network device;
   instructions for uploading the first current network interface to a remote Wireless Controller, the remote Wireless Controller implementing a first control plane capability on behalf of the first network device; and
   instructions for receiving, after uploading the first current network interface, an update to the first current network interface, the update provided by the remote Wireless Controller.

11. The non-transitory computer readable storage medium as in claim 10, wherein the instructions for determining the first current network interface utilized by at least one port of the first network device include:
   instructions for extracting the data from at least one layer of the incoming data packet;
   instructions for utilizing the data to determine at least one characteristic of protocol activity currently occurring at the port of the first network device; and
   instructions for creating the current network interface based on the at least one characteristic of protocol activity.

12. The non-transitory computer readable storage medium as in claim 11, wherein the instructions for utilizing the data to determine the at least one characteristic of protocol activity currently occurring at the port of the first network device include:
   instructions for selecting at least one from a group comprising:
      (i) instructions for identifying a link status on the port, wherein identifying the link status includes: identifying the link speed;
      (ii) instructions for identifying a type of vendor associated with a device connected to the port; and
      (iii) instructions for identifying at least one virtual local area network (VLAN) observed at the port.
(iv) instructions for identifying at least one Internet Protocol subnet observed at the port.

13. The non-transitory computer readable storage medium as in claim 10, wherein the instructions for uploading the first current network interface to the remote Wireless Controller include:
instructions for uploading the current network interface to the remote Wireless Controller while the remote Wireless Controller implements a second control plane capability on behalf of a second network device, the second network device containing only a second data plane portion.

14. The non-transitory computer readable storage medium as in claim 10, comprising:
wherein the instructions for determining the first current network interface of the first network device are executable with respect to an initialization process of the first network device; and
wherein the initialization process includes: instructions for obtaining a network address of the at least one port of the first network device.

15. The non-transitory computer readable storage medium as in claim 10, wherein the instructions for receiving the update to the first current network interface includes:
instructions for receiving an indication that the first current network interface is valid; and
instructions for receiving at least one configuration message from the remote wireless controller.

16. The non-transitory computer readable storage medium as in claim 15, comprising:
instructions for reconfiguring the at least on port based on the configuration message received from the remote Wireless Controller.

17. The non-transitory computer readable storage medium as in claim 16, wherein the instructions of r reconfiguring the at least on port based on the configuration message includes:
instructions for storing the first current network interface;
instructions for rebooting the first network device; and
instructions for modifying, as the first network device reboots, the first current network interface based on the configuration message received from the remote Wireless Controller.

18. The non-transitory computer readable storage medium as in claim 10, comprising:
wherein the instructions for determining the first current network interface utilized by at least one port of the first network device include:
instructions for extracting the data from at least one layer of the incoming data packet;
instructions for utilizing the data to determine at least one characteristic of protocol activity currently occurring at the port of the first network device; and
instructions for creating the current network interface based on the at least one characteristic of protocol activity;
wherein the instructions for uploading the first current network interface to the remote Wireless Controller include:
instructions for uploading the current network interface to the remote Wireless Controller, the remote Wireless Controller concurrently implementing the first control plane capability with a second control plane capability on behalf of a second network device, the second network device containing only a second data plane portion; and
wherein the instructions for receiving the update to the first current network interface include:
instructions for receiving an indication that the first current network interface is valid; and
instructions for receiving at least one configuration message from the remote Wireless Controller, the at least one configuration message providing a reconfiguration of the at least one port of the first network device to occur during a reboot of the first network device.

19. A network device comprising:
a processor;
a memory unit that stores instructions associated with an application executed by the processor; and
an interconnect coupling the processor and the memory unit, enabling the computer system to execute the application and perform operations of:
based on data included within at least one incoming data packet, determining a first current network interface utilized by at least one port of the network device, the at least one incoming data packet received at the at least one port of the network device;
uploading the first current network interface to a remote Wireless Controller, the remote Wireless Controller implementing a first control plane capability on behalf of the network device; and
after uploading the first current network interface, receiving an update to the first current network interface, the update provided by the remote Wireless Controller.

20. A method comprising:
in a first network device:
receiving a current network interface from at least one remote network device, the first network device implementing a control plane capability, in accordance with a network architecture, on behalf of the remote network device, wherein the remote network device implements a data control plane in accordance with the network architecture;
processing the current network interface to produce a configuration message, the configuration message managing the remote network device with respect to protocol activity on at least one port of the remote network device; and
transmitting the configuration message to the remote network device.

* * * * *